Oct. 14, 1952   P. MARIÉ   2,614,170
DIRECTIONAL COUPLER FOR POLYPHASE NETWORKS
Filed Oct. 4, 1948

INVENTOR
PIERRE MARIÉ
BY *Ben. J. Chrony*
his ATTORNEY

Patented Oct. 14, 1952

2,614,170

UNITED STATES PATENT OFFICE 2,614,170

DIRECTIONAL COUPLER FOR POLYPHASE NETWORKS

Pierre Marié, Boston, Mass., assignor to Societe francaise Sadir-Carpentier, Paris, France, a corporation of France Application October 4, 1948, Serial No. 52,772
In France October 4, 1947

6 Claims. (Cl. 178—44)

The present invention relates to circuits for electromagnetic waves, chiefly for those of a very high frequency.

These circuits consist of electric networks having various advantageous properties to be disclosed hereinafter together with various applications of such networks.

According to the invention, the circuit is constituted by a mesh network including a number of apices connected with external lines.

Figure 1:
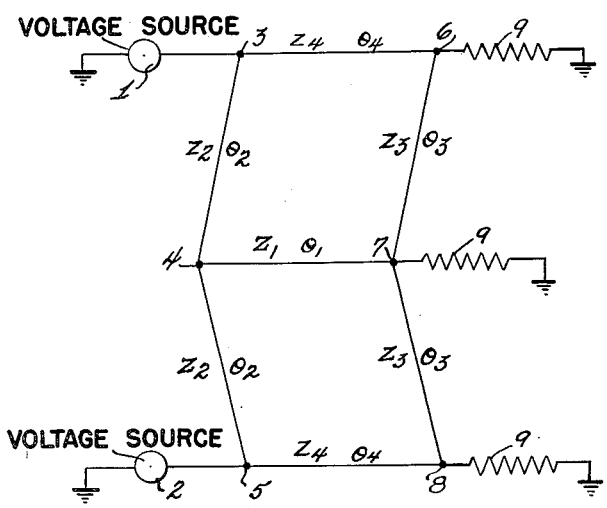

As shown in Fig. 1 of the accompanying drawings, the apices 3 and 5 of the network are connected with sources of supplies of electrical energy while the other apices 6, 7 and 8 are connected with the different lines of a three phase network. These different lines have substantially the same impedance which is represented in each line by the impedance device 9. The network is constituted by a system of line sections suitably connected with one another, such as lines constituted for instance by double wire lines, coaxial wires, wave guides and the like. The network is designed in a manner such that if the supply 1 furnishes energy to the apex 3 without any other incorporation of energy being provided, no electric voltage is collected at the apex 5, all of the energy being distributed to the other apices under the form of voltages forming a polyphase balanced system. Conversely, if the network is fed exclusively through the supply 2, no electric voltage is collected at the apex 3 and all of the energy is distributed under the form of a balanced polyphase system to the other apices. But the succession of phases is then opposed to that appearing when the network is fed by the supply 1.

This shows the invention allows obtaining in a network for radio waves, a system of three phase voltages starting from two independent sources, said system being balanced when only one of the sources feeds it. The invention has also for its object the application of such an arrangement to the measurement of the relative phase between two high frequency waves. This is obtained by making the two waves act as the two sources feeding the network referred to, detectors being inserted in the three wires starting from the points at which the three phase voltage system is collected after which the three direct current voltages obtained are sent into the three coils, arranged at 120° with reference to one another, of an indicator apparatus so as to define the direction of the resultant magnetic field and thereby the phase difference sought for.

The present invention has further for its object to provide relays for wireless waves making use of the properties of the electric circuit of the type described hereinabove. The expression "wireless wave relays" is intended to cover stationary or movable stations that include means for collecting electro-magnetic energy radiated from a remote transmitting station, said energy being amplified with or without the interposition of an intermediary transformer, and lastly members radiating again the amplified energy. The electric circuits disclosed hereinabove are readily adapted for use in such relays and allow moreover the latter to play their part whether the incoming energy progresses in one direction or the opposite direction, the general average direction of propagation only being defined. This result is obtained with a single collecting member or system of members together with a single directionally radiating member or system of members.

Figure 2:
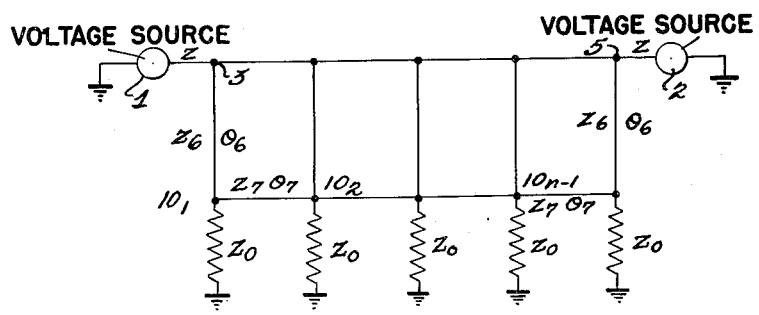
Figure 3:
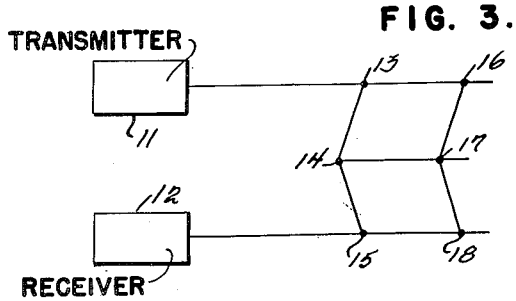

The invention will now be disclosed with reference to accompanying drawings, wherein Figs. 1, 2 and 3 are diagrammatic showings of the network.

In Figs. 1 to 3 the solid lines illustrate either single wire lines consisting of the inner conductors of coaxial lines, the outer sheaths of which are grounded and are not illustrated. Furthermore these solid lines may be a single system of wires or double wire lines of which the other wire is obtained through duplication. More generally speaking these solid lines may represent electrical guides of any type whatever. In the following description the expression "line" will be used for sake of simplicity but this should be interpreted as including any of the above equivalents.

It will be supposed that the line sections forming the network show no substantial losses. The apices of the network where the voltages appear that form the polyphase system are connected with lines having the same electric characteristics, said lines being arranged between the apices and ground.

Fig. 1 shows the application of the invention to the case of a three phase network; the network includes as shown seven line sections 3—6, 4—7, 5—8 and 3—4, 4—5, 6—7, 7—8, the references 3 to 8 designating the apices of the network meshes. The system is doubly symmetrical, in other words the electric characteristics of the sections 3—6 and 5—8 are equal and so are those of the elements 3—4 and 4—5 and also those of 6—7 and 7—8.

The values of the characteristic impedances and of the electric angles of the elements 4—7 will be designated respectively as $Z_1$ and $\theta_1$, the similar characteristics of the elements 3—4 and 4—5 will be designated as $Z_2$ and $\theta_2$. Those of the elements 6—7 and 7—8 will be designated as $Z_3$ and $\theta_3$, and lastly $Z_4$ and $\theta_4$ designate the same characteristics for the extreme elements 3—6 and 5—8. The sources 1 and 2 as seen from the network have the same characteristic impedance Z. They are connected respectively with the points 3 and 5. The ends of the three wire line are connected with the points 6—7 and 8, this line is illustrated diagrammatically under the form of identical impedances inserted between said three points and the ground. It will be assumed that the line shows no loss and experience shows this hypothesis is practically correct. The characteristic impedance of each of the lines 9 is equal to $Z_0$. Under such conditions, as is well known, the different values Z and $\theta$ are real, Z having for its value $$\sqrt{\frac{L}{C}}$$

and $\theta$ having for its value $$\omega\sqrt{\frac{L}{C}}$$

L and C being the values per unit of length of the self inductance and of the capacity of the element considered of the transmission line and $\omega$ the pulsation of the currents flowing through the network.

The desired result is obtained starting from the fact that a sinusoidal voltage being applied by the source 1 between the point 3 and ground, there is obtained a voltage of zero value between 5 and ground which means there is no reaction of the source 1 on the source 2. On the other hand there is obtained a system of three phase voltages shifted by $$\frac{2\pi}{3}$$

with reference to one another and having the same value between the points 6—7 and 8 and the ground which actually provides the system of voltages sought for.

Starting from the telegraphist equation relating to lines without any losses, calculation shows that the result referred to is possible and is obtained by choosing for the above characteristics the following values $$\cos^2 \theta_1 = \frac{(2y-1)^2 a}{2(2-a)}$$

$$\cos^2 \theta_2 = \frac{(1-ay)^2}{2(2-a)}$$

$$\cos \theta_3 = \frac{y-1}{2}$$

$$\cos^2 \theta_4 = \frac{ay^2}{4}$$

(I)
$$\left[\frac{Z_1}{Z_0}\right]^2 = \frac{3a}{2(2-a)-a(2y-1)^2}$$

$$\left[\frac{Z_2}{Z_0}\right]^2 = \frac{3a^2}{2(2-a)-(1-ay)^2}$$

$$\left[\frac{Z_3}{Z_0}\right]^2 = \frac{3}{4-(y-1)^2}$$

$$\left[\frac{Z_4}{Z_0}\right]^2 = \frac{3a}{4-ay^2}$$

The parameter $a$ that has no dimensions is equal to the ratio $$\frac{Z}{Z_0}$$

which is given as an element of the problem while $y$ is an arbitrary parameter that has no dimensions either. Complementary equations define the signs of the trigonometric expressions provided by the above relations and are of the following form $$\Sigma(2y-1) \tan \theta_1 < 0$$

$$\Sigma(1-ay) \tan \theta_2 < 0$$

$$\Sigma \sin \theta_3 > 0$$

$$\Sigma y \tan \theta_4 < 0$$

$\Sigma$ being equal to $+1$ or $-1$ according to the order of succession of the phases of the system of three phase voltages obtained.

By reason of the symmetry of the system, the calculation relating to the feeding of the three phase system through the source 2 is obviously the same and it is immediately apparent that the direction of rotation of the three phase voltages generated by the source 2 in the lines 9 is opposed to that of the voltages generated by the source 1 without the source 2 reacting on the source 1.

It will be noticed that it is necessary, if the solution provided by the above system of equations is to be physically possible, for the values obtained in the second members of the system 1 to be positive except possibly for $\theta_3$ and, on the other hand, the value provided for the cosines should be between $+1$ and $-1$. Calculation shows that if these conditions are satisfied, the values of $a$ and $y$ satisfy the following relationships:

$$-1 < y < 3$$

$$0 < a < \frac{1}{(y-\frac{1}{2})^2 + \frac{1}{2}} \cdots$$

It is apparent that the possible value of $a$ depends on that assumed by $y$ and obviously for $y = \frac{1}{2}$ the range of possible variation of $a$ is a maximum as $a$ is of necessity positive. Consequently the ratio $$\frac{Z}{Z_0}$$

cannot be chosen in an entirely arbitrary manner.

It will be noticed lastly that the conditions to be satisfied depends on the frequency of operation of the system as this frequency has an action on the value of the electric angles of the line elements.

To obtain a system the properties of which are as little sensitive as possible to the variations in said frequency of operation, it is obviously of interest to select values of these electric angles that are as low as possible which leads to suitably defining the value of Z, $Z_0$ and $y$ and in choosing the lowest value for the $\theta$ angles among those the trigonometric lines of which satisfy the equations (I).

The invention will be readily executed by anyone skilled in the art as it is a usual practice to produce line elements that have predetermined characteristic values Z and $\theta$.

According to a modification, the network may be constituted by a system similar to that of Fig. 1 but with the incorporation of a supplementary line connecting the apices 6 and 8, said supplementary line having an electric angle $\theta_5$ equal to $$\frac{2\pi}{3}$$

In this case, the system depends on one parameter more. Supposing $Z_5$ is the impedance of this supplementary section if $b$ is supposed to be equal to $$\frac{Z_0}{Z_5}$$

calculation shows, if the same notations are used as precedingly, that the equations (I) remain unaltered except for those giving $Z_3$ and $\theta_3$ that are replaced by the following equations:

$$\cos\theta_3{}^1 = \frac{y}{2(b+1)} - \frac{1}{2}$$

$$\left[\frac{Z_3{}^1}{Z_0}\right]^2 = \frac{1}{\left(1+b+\frac{y}{3}\right)^2 - \frac{4}{9}y^2} \cdots$$

It will be noticed that the two above formulae provide expressions similar to those of the equations (I) when $b=0$, that is when $Z_5$ is infinite. It is also apparent that $b$ cannot be entirely arbitrary as it is necessary in this case also to obtain a value of $\cos\theta_3$ that is comprised between $-1$ and $+1$.

Fig. 2 is a wiring diagram of a network for a polyphase system; this network is constituted diagrammatically by a system of $n-1$ rectangles arranged side by side, $n$ being the number of phases and the lines of the polyphase system are connected to the apices $10_1$—$10_2$ ... $10_{n-1}$—$10_n$. The sources 1 and 2 that do not react on one another are again present and are connected with the outer apices 3 and 5. The calculation of the network is executed in the same manner as for a three phase network and in particular the relationship between the values of the characteristics $Z$ and $\theta$ of the extreme sections is obtained immediately without the remainder of the network interfering therewith. Supposing $Z_6$ and $\theta_6$ are the characteristic values for the sections 3—10 and 5—10 that are equal to one another while $Z_7$—$\theta_7$ are the characteristic values of the equal sections $10_1$—$10_2$ ... $10_{n-1}$—$10_n$; the following equations are obtained.

$$\frac{Z_7}{Z_0} = \frac{\sin\frac{2\pi}{n}}{\sin\theta_7}$$

$$\frac{Z_6}{Z_0} = \frac{\sin\frac{2\pi}{n}\cot\theta_6}{\cos\theta_6 - \cos\frac{2\pi}{n}}, \quad \frac{Z_6{}^2}{ZZ_0} = \frac{n}{4\sin^2\theta_6}$$

In this case again a modification consists in inserting a supplementary section connecting the outer apices $10$ and $10_n$, said section having an impedance $Z_8$ and an electric angle $$\theta_8 = \frac{2\pi}{n}$$

In this case the preceding equations are to be modified correspondingly.

It is possible without unduly widening the scope of the present invention as defined in accompanying claims to insert in all or part of the line sections forming the network quarter wave transformers matching the impedances. Similarly the lines may be associated with quarter wave sections that are short circuited at their opposed ends.

It is possible to mention by way of exemplification and without any limitation to the invention, the application of the system disclosed in view of reducing or doing away with the spark gap through which operation of a radar is shifted from emission to reception.

The above disclosed networks allow also passing from coaxial to polyphase operation and are obviously capable of providing such an application as illustrated in Fig. 3.

A radar emitting station 11 energizes at 13 a three phase directional coupling system according to the present invention and it transmits no voltage to the apex 15 with which the receiver 12 is connected. To the apices 16—17—18 are connected the three wires of a line feeding energy to the aerial.

In such an arrangement, it is obvious that practically the entire energy of the echo is directed towards the receiver and by no means towards the transmitter 11: as a matter of fact if the electric angles corresponding to the time required for the waves to reach 16—17 and 18 respectively, when starting form 13 (or symmetrically for reaching 18—17—16 when starting from 15) are equal to $$-\frac{2\pi}{3} + \alpha, \ \alpha \text{ and } \alpha + \frac{2\pi}{3}$$

the time required by waves for progressing from 13 to 15 after reflection from an obstacle will correspond to the electric angle $2\alpha$ increased by the electric angle $2\beta$ corresponding to the to and fro movement between 17 and the obstacle whatever may be the wire selected by the wave in the system of three wires. In contradistinction, the time required for a wave starting from 13, and returning thereto after reflection from the obstacle will correspond to the angles $$2\alpha - \frac{4\pi}{3}, \ 2\alpha, \ 2\alpha + \frac{4\pi}{3}$$

increased by the angle $2\beta$ corresponding to a to and fro movement towards and away from the obstacle according as to whether the wave passes through the apices 16—17 or 18. Now three waves of same intensity and phase shifted by $$\frac{4\pi}{3}$$

with reference to one another have a zero resultant. The energy emitted by 11 and reflected by any obstacle may be thus considered as subdivided into three portions that are in phase concordance at 15 and in phase opposition at 13 which leads to the result given hereinabove.

Obviously many other applications fall within the scope of the invention as defined in accompanying claims, in particular it is possible to apply it to altimeter systems operating radioelectrically through frequency modulation.

What I claim is:

1. A directional coupler for high frequency waves for coupling two separate sources with a polyphase system comprising an electrical network consisting of $(n-1)$ four-line elements, $n$ being equal to at least three, each of said elements being connected to form four sided loops, connections for connecting the adjacent ones of said loops to have one line in common so that said loops are connected into a chain wherein the outer loops have extreme lines corresponding to the common lines, said extreme lines of said outer loops not being common to the other loops, $n$ phase lines connected respectively with one end of each of said common lines and with one end of each of said extreme lines, and means for connecting the sources of high frequency waves with the other ends of said extreme lines, the impedances and electrical angles of the different lines of said elements being symmetrical with reference to a medial imaginary line at equal distances from said extreme lines and selected to provide a balanced system when only one of said sources feeds high frequency waves thereto and to prevent any undesired reaction of one of said sources on the other.

2. A directional coupler network for high frequency waves for coupling two separate sources with a polyphase system comprising an electrical network consisting of a plurality of meshes, each of said meshes having a plurality of branches, connections for connecting the adjacent ones of said meshes with one branch thereof in common so that said meshes are connected into a chain wherein the outer meshes have extreme lines that are not common to more than one of said meshes, the electric waves in said common branches of the corresponding meshes being opposed, $n$ phase lines of a polyphase system connected to selected ones of said meshes and means for connecting sources of high frequency waves to selected ones of said meshes such that said sources deliver their outputs simultaneously to said polyphase system without reacting on each other.

3. A directional coupler network for high frequency waves for coupling two separate sources with a polyphase system comprising an electrical network consisting of a plurality of meshes connected together to form a chain so that the adjacent ones of said meshes have one branch in common, the outer meshes of said chain have remote branches that are not common to other meshes of said chain, and means for connecting sources of high frequency waves to said remote branches, means for connecting the phases of a polyphase system to branches of said meshes including said common branch and to said remote branches at points other than those that are connected to said sources to provide an electrically balanced system when only one of said sources feeds high frequency waves to said meshes and to prevent any undesired reaction of one of said sources on the other.

4. A directional coupler network for high frequency waves for coupling two separate sources with a polyphase system comprising a plurality of meshes each having four branches, connections for connecting said meshes into a chain with one branch of adjacent meshes common to said adjacent meshes, two sources of high frequency oscillations, connections for connecting said sources to said meshes such that at least two branches of different meshes are connected between said sources, a polyphase system, connections for connecting said polyphase system to said meshes such that a branch of a different mesh extends between different phases of said system and each of said sources, the impedances and electrical angles of the different branches being such that the network has an imaginary line of electrical symmetry extending therethrough parallel to one of the common branches, said line of electrical symmetry being selected to provide a balanced system when only one of the sources feeds the network and to prevent any reaction of one source on the other.

5. A directional coupler for polyphase circuits comprising a pair of sources of high frequency oscillations, a plurality of loops, each of said loops consisting of four lines, said lines being connected together to form loops having four apices, connections for connecting adjacent ones of said loops together so that one of the aforesaid lines and two of the apices of the adjacent loops are common thereto, terminals connected to the apices of said loops, two of said terminals separated by two of said lines comprising the input terminals, connections for connecting said sources to said input terminals, another one of said terminals separated by one of said lines from one of said input terminals comprising the first output terminal, another of said terminals separated from the other of said input terminals by another of said lines comprising a second output terminal, a third output terminal comprising another of said terminals separated from each of said first and said second output terminals by one of said lines respectively, and a three phase output circuit connected to said output terminals, the impedances and electrical phase angles of said lines being symmetrical with reference to said common line to provide a balanced system when only one of said sources feeds high frequency oscillations thereto to prevent undesired reaction of one of said sources on the other.

6. A directional coupler for polyphase circuits comprising a pair of sources of high frequency oscillations, a plurality of $n-1$ loops, were $n$ is equal to at least three, each of said loops consisting of four lines, said lines being connected together to form loops having four apices, connections for connecting adjacent ones of said loops together so that one of the aforesaid lines and two of the apices of the adjacent loops are common thereto, to form a chain of loops, said chain having a pair of outer loops each having a pair of apices that are not common with other loops of said chain, an input terminal connected to one of said pair of the apices of one of said outer loops, an output terminal connected to the other apex of said last mentioned pair of apices, another input terminal connected to one of the apices of the other of said pair of apices, another output terminal connected to the other apex of said last mentioned pair of apices, connections for connecting said sources to said input terminals, a third output terminal separated from each of said first and said second output terminals by at least one of said lines respectively, said third output terminal being separated from each of said input terminals by at least two of said lines, and a polyphase output circuit connected to said output terminals, the impedances and electrical phase angles of said lines being symmetrical with reference to said common line to provide a balanced system when only one of said sources feeds high frequency oscillations thereto to prevent undesired reaction of one of said sources on the other.

PIERRE MARIÉ.

REFERENCES CITED

The following references are of record in the file of this patent:

UNITED STATES PATENTS

| Number | Name | Date |
|---|---|---|
| 2,287,174 | Heising | June 23, 1942 |
| 2,301,635 | Norton | Nov. 10, 1942 |
| 2,369,268 | Trevor | Feb. 13, 1945 |
| 2,400,796 | Watts et al. | May 21, 1946 |
| 2,401,717 | Wolff et al. | June 4, 1946 |
| 2,416,790 | Barrow | Mar. 4, 1947 |
| 2,424,156 | Espley | July 15, 1947 |
| 2,444,426 | Busignies | July 6, 1948 |
| 2,445,895 | Tyrrell | July 27, 1948 |
| 2,468,237 | Sanders | Apr. 26, 1949 |
| 2,495,589 | Masters | Jan. 24, 1950 |